United States Patent
Vande Ryse

(10) Patent No.: US 7,513,088 B2
(45) Date of Patent: Apr. 7, 2009

(54) BALE WRAPPING APPARATUS

(75) Inventor: Johan A. E. Vande Ryse, Bruges (BE)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 11/961,378

(22) Filed: Dec. 20, 2007

(65) Prior Publication Data

US 2008/0092756 A1    Apr. 24, 2008

Related U.S. Application Data

(62) Division of application No. 11/411,703, filed on Apr. 26, 2006, now abandoned.

(30) Foreign Application Priority Data

Apr. 27, 2005    (GB)  ................................ 0508426.4

(51) Int. Cl.
    *A01F 15/07*    (2006.01)
    *B65B 11/56*    (2006.01)
(52) U.S. Cl. ........................ 53/118; 53/587; 53/389.2
(58) Field of Classification Search .................. 53/118, 53/587, 389.2
    See application file for complete search history.

(56) References Cited

U.S. PATENT DOCUMENTS

| 2,803,174 | A | * | 8/1957 | Linstedt | 493/100 |
|---|---|---|---|---|---|
| 2,877,612 | A | * | 3/1959 | Berney | 53/118 |
| 3,013,367 | A | * | 12/1961 | La Sarre | 53/520 |
| 3,955,340 | A | * | 5/1976 | Tomita et al. | 53/587 |
| 4,578,932 | A | * | 4/1986 | Cooke | 53/587 |
| 4,604,848 | A | * | 8/1986 | Clostermeyer | 53/118 |
| 4,612,855 | A | * | 9/1986 | Wagstaff et al. | 100/5 |
| 4,841,851 | A | * | 6/1989 | Quataert | 100/5 |
| 4,956,968 | A | * | 9/1990 | Underhill | 56/341 |
| 5,036,642 | A | * | 8/1991 | Underhill | 53/118 |
| 5,289,672 | A | * | 3/1994 | Underhill | 53/587 |
| 5,315,925 | A | * | 5/1994 | Viaud et al. | 100/88 |
| 5,479,767 | A | * | 1/1996 | McClure et al. | 56/343 |
| 5,557,906 | A | * | 9/1996 | Viaud | 53/118 |
| 6,021,622 | A | * | 2/2000 | Underhill | 53/118 |

FOREIGN PATENT DOCUMENTS

WO    WO 2005009112 A2 *   2/2005

* cited by examiner

*Primary Examiner*—Stephen F Gerrity
(74) *Attorney, Agent, or Firm*—Patrick M. Sheldrake; John William Steder; Michael C. Harms

(57) ABSTRACT

A device is disclosed for introducing the free end of a wrapping material into the bale forming chamber of a round baler. The device comprises a pair of elongate plates 122a and 122b that are biased towards one another to grip the wrapping material between them. One of the plates 122a has a leading edge that projects further than the other in the feeding direction of the wrapping material 30. In the invention, the leading edge is formed with forward projecting resiliently flexible fingers 124d which are transversely spaced from one another.

9 Claims, 3 Drawing Sheets

BALE WRAPPING APPARATUS

This divisional application claims priority under 35 U.S.C. § 120 from U.S. patent application Ser. No. 11/411,703, filed on Apr. 26, 2006 by Johan A. E. Vande Ryse with the same title, which is currently abandoned, the full disclosure of which is hereby incorporated by reference.

FIELD OF THE INVENTION

The present invention relates generally to agricultural baling machines and more particularly to a round baler for producing cylindrical bales, commonly referred to as round bales, having an improved wrapping apparatus for wrapping a cylindrical package of crop material formed in a bale forming chamber.

BACKGROUND OF THE INVENTION

Round balers generally have a bale forming chamber defined by a pair of opposing side walls associated with an array of side-by-side belts, transverse slats trained on chains, a plurality of transverse rollers or a combination of these various elements, e.g. rollers and belts. During field operation, windrowed crop material such as hay is picked up from the ground and fed in a continuous stream into a fixed or variable diameter chamber. The hay is rolled into a cylindrical package within the chamber, wrapped with twine, netting or a plastics film and ejected onto the ground for subsequent handling.

U.S. Pat. Nos. 5,289,672 and 4,956,968 disclose one type of prior art round baler of the general nature described above. In this particular type of baler an expandable chamber is defined by a pair of fixed sidewalls, and a plurality of side-by-side belts cooperating with a series of transverse rollers, mounted between a pair of pivotally mounted arms. This arrangement of rollers and arms is commonly referred to as a sledge assembly. The chamber includes an inlet opening in the front through which crop material is fed. Also included is a pair of take-up arms pivotally mounted on the main frame, between which arms a pair of guide rollers are journalled. A biasing force on the take-up arms urges the outer surfaces of the guide rollers against the belts to maintain tension and thereby prevent slack from occurring in the belts during expansion and contraction of the chamber. Density of the bale can be affected by varying the force on the take-up arms.

Another type of prior art round baler of the same general nature employs a plurality of transverse rollers to define a cylindrical bale forming chamber with a fixed diameter. Examples of this type of baler are shown in, U.S. Pat. Nos. 4,604,848 and 4,841,851. It should be noted that the latter patent shows additional embodiments wherein a fixed chamber is defined by means other than rollers, i.e. belts (FIG. 7) or chains and slats (FIG. 8).

The present invention relates to a wrapping system for a round baler in which a cylindrical package of crop material is formed in a fixed or expanding chamber which includes one or more transverse rollers or a combination of belts and rollers of the general nature described in U.S. Pat. No. 5,289,672, cited above. This is one example of the many prior art patents that disclose this type of expandable chamber round baler.

It is not uncommon in prior art round balers having this general configuration to feed the wrapping material between a pair of transverse rollers. Alternatively, the chamber could comprise fixed side walls and transverse elements at fixed locations in a configuration of the general nature described in U.S. Pat. No. 4,612,855, cited above.

There is a need for a wrapping system for round balers that consistently introduces wrapping material to the periphery of the cylindrical package formed in the chamber regardless of whether the diameter of the chamber is fixed or variable, and regardless of the nature of the transverse wall, i.e. belts, rollers or chains. More particularly, there is a need for a system that consistently initiates the wrapping function. Such system contributes to improved performance and operability of round balers. Additionally, the features thereof should be consistent with lower manufacturing costs without detracting from simplicity of field operation and serviceability.

EP 0 965 263 discloses a round baler having means for feeding wrapping material from a supply roll of wrapping material into the chamber between two transverse rollers for wrapping around the outer surface of the cylindrical package of crop material to form a round bale of crop material. The two transverse rollers may either be in direct contact with the crop or they may be the drive or guide rollers of a belt or apron which engages the crop. The teaching in EPO 0 965 263 is to provide feed assist means extending from the transverse rollers for intermittent contact with the wrapping material as it is being dispensed into the chamber under conditions where the outer surface of a cylindrical package of crop material is being wrapped in the chamber.

The present invention is concerned with the means for introducing the wrapping material from a supply roll into the chamber. These means are constituted in EP 0 965 263 by a device also known, and referred to herein, as a duck bill. A duck bill is formed by two plates of which one is spring biased towards the other. One plate is fixed between two end plates and the other is hinged and spring biased towards the fixed plate, the wrapping material being gripped between the free edge of the spring biased plate and the fixed plate. Such a design acts as a one-way clutch which allows the wrapping material to move in only one direction through the duck bill.

The end plates are arranged to move both plates of the duck bill between a retracted position and an advanced position. When the duck bill is moved into its advanced position, its two plates pass between two transverse rollers and pull the leading edge of the wrapping material into the bale forming chamber. Once the wrapping material is engaged by the rotating crop or one of the two transverse rollers, normally the lower roller, it is carried around the bale that is being formed and the required wrapping material is drawn freely from the supply roll through the duck bill. While the bale is being wrapped or after wrapping has ended, the duck bill is withdrawn to its retracted position. Towards the end of the baling cycle, a cutter is used to sever the wrapping material at a point between the duck bill and the wrapped bale. The material to one side of the cutter is drawn into the bale forming chamber by the rotating bale while the free end of the wrapping material from the supply remains gripped between the two plates of the duck bill in readiness to wrap the bale that is formed in the next baling cycle.

The transverse rollers between which wrapping material is introduced into the bale forming chamber both rotate in the same direction, i.e. they both rotate clockwise or anticlockwise depending on the side of the baler from which they are viewed. If the wrapping material is engaged by the lower roller, it is drawn into the bale forming chamber as earlier described. However, if due to a mis-feed, the wrapping material is engaged by the upper roller, it is drawn out of the bale forming chamber and, especially if the upper transverse roller is the drive roller of a belt, the wrapping material can then be drawn into the drive mechanism of the baler and cause a total breakdown.

The wrapping materials commonly used are netting or a plastics film. U.S. Pat. No. 4,956,968 which is believed to represent the closest prior art to the present invention, discloses in FIG. 5 a design of the leading edge of the fixed plate of the duck bill which overcomes the mis-feed problem described above when netting is used as the wrapping material. The leading edge in the latter patent is provided with notches in which the netting becomes caught if it is dragged across the leading edge of the duck bill in the wrong direction. As the force tending to cause the netting to become wrapped around the drive mechanism is only a frictional force, it cannot overcome the grip of the notches in the leading edge of the duck bill. Therefore, in the event of a mis-feed, the wrapping material is prevented from entering the workings of the baler.

When using a plastics film as a wrapping material, the side of the film facing the bale needs to be tacky in order for it to adhere to the crop and to itself. For this reason, the plastics film may have an applied coating of a specially formulated weak adhesive. While advancing the duck bill towards the bale forming chamber, it is possible for the loose flap of wrapping material in front of the duck bill to fold backwards over the leading edge of the duck bill and, because of its tackiness, it can stick to itself or to the duck bill. When the duck bill subsequently enters between two transverse rollers into the bale forming chamber, there is no free flap of film that can be engaged by the lower transverse roller or the crop and therefore the wrapping material fails to be drawn into the bale forming chamber.

OBJECT OF THE INVENTION

The present invention seeks therefore to provide an improved design of a device for introducing the free end of a wrapping material into the bale forming chamber of a baler which is particularly suitable for use with wrapping film and which ensures reliable take up of the wrapping material by the bale.

SUMMARY OF THE INVENTION

According to a first aspect of the present invention, there is provided a device for introducing the free end of a wrapping material into the bale forming chamber of a round baler, comprising a pair of elongate plates that are biased towards one another to grip the wrapping material therebetween, one of the plates having a leading edge that projects further than the other in the feeding direction of the wrapping material, wherein the leading edge is formed with forward projecting resiliently flexible fingers which are transversely spaced from one another.

In a second aspect of the invention, there is provided a round baler having a bale forming chamber and a device as set forth above for feeding wrapping material from a supply roll into the bale forming chamber between two transverse rollers acting to cause the crop to rotate within the bale forming chamber, wherein the device is displaceably mounted in the baler for movement between a retracted position in which the flexible fingers lie outside the bale forming chamber and an advanced position in which the flexible fingers pass between and beyond the narrowest point of the gap between the transverse rollers so as to lie close to the path of the crop material within the bale forming chamber.

The device and baler of the present invention differ from U.S. Pat. No. 4,956,968 in that in the latter patent the fixed plate with notches in its leading edge is rigid. The rigidity of the leading edge is essential if the wrapping material is to be gripped sufficiently firmly during a mis-feed to prevent any further wrapping material from being drawn from the supply roll. Furthermore, being rigid, the leading edge of the duck bill cannot be allowed to make contact with a rotating bale and it does not therefore enter the bale forming chamber, its movement taking it no further than the gap between the two transverse rollers.

By contrast, the fingers on the leading edge of the duck bill in the present invention are sufficiently long to penetrate into the bale forming chamber to come into contact with the bale and their flexibility allows them to bend so that the top surface is wiped by the surface of the bale being formed as it rotates in the chamber. This action will itself tend to peel off any film adhering to the top surface of the duck bill. Even if the flap wrapped over the leading edge of the duck bill is longer than the projecting fingers, the regions of the wrapping material between the fingers can be gripped between the rough surface of the bale and the lower of the two transverse rollers between which the duck bill is introduced into the bale forming chamber.

Preferably, the tips of the fingers are rounded to avoid their piercing the wrapping material.

As the plates need to be rigid in order to grip the wrapping material effectively between them, the fingers may be part of an attachment formed separately from the two elongate plates and secured to one of the plates.

The attachment is conveniently formed of a plastics material, preferably a polyamide.

The attachment may be secured in any suitable manner to one of the elongate plates, such as by means of mechanical fixings. Care should of course be taken to prevent the wrapping material from snagging on the fixings.

While the device of the invention is designed to work with wrapping material in the form of a plastics film, it has been found in practice to work effectively with netting as the flexible fingers can also function in the same manner as the notched leading edge taught in the prior art to prevent the netting material from being drawn into the workings of the baler.

BRIEF DESCRIPTION OF THE DRAWINGS

The invention will now be described further, by way of example, with reference to the accompanying drawings, in which.

DETAILED DESCRIPTION OF THE EXEMPLARY EMBODIMENTS

The drawings and following description concentrate on a wrapping mechanism for use in a baler. The remainder of the baler will not be described or illustrated in detail but it is mentioned for completeness that the baler may be as described in U.S. Pat. No. 4,956,968, which is incorporated herein by reference.

Figure 1:
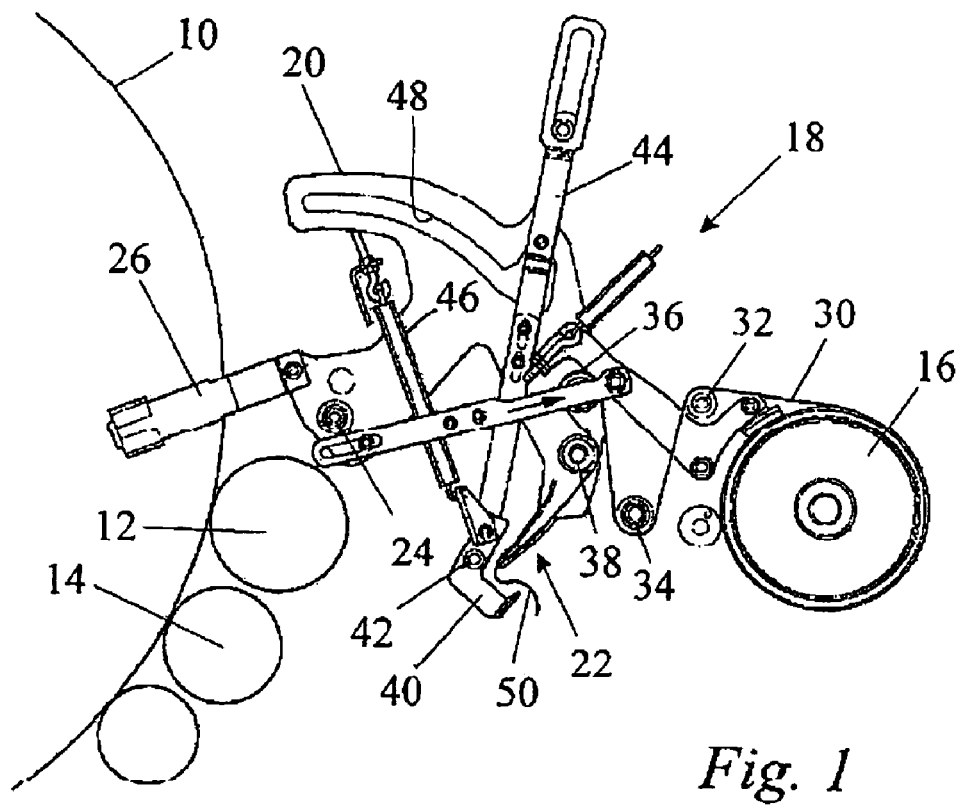
FIG. 1 is diagram showing a wrapping mechanism of a baler at the end of a wrapping cycle with the duck bill in its retracted position.

In accompanying FIG. 1, a bale being formed in the bale forming chamber of a round baler is designated 10. The bale 10 is caused to rotate within the chamber by various transverse rollers and/or belts of which only the two rollers designated 12 and 14 are relevant to the present invention. To wrap the bale 10, a wrapping material 30 drawn from a supply roll 16 is introduced by a feed mechanism generally designated 18 through the gap between the two rollers 12 and 14 into the bale forming chamber.

The feed mechanism comprises two end plates 20 arranged on opposite sides of the baler and a duck bill generally designated 22 which extends across the width of the baler between the two end plates 20. In the duck bill 22, which is described in further detail below, the wrapping material is gripped between a plate that is fixed to the two end plates 20 and a pivoted plate that is spring biased towards the fixed plate. The wrapping material 30 passes between the fixed plate and the pivoted plate and is gripped by them. The wrapping material can pass freely through the duck bill 22 when moving towards the bale forming chamber but not in the opposite direction.

Figure 2:
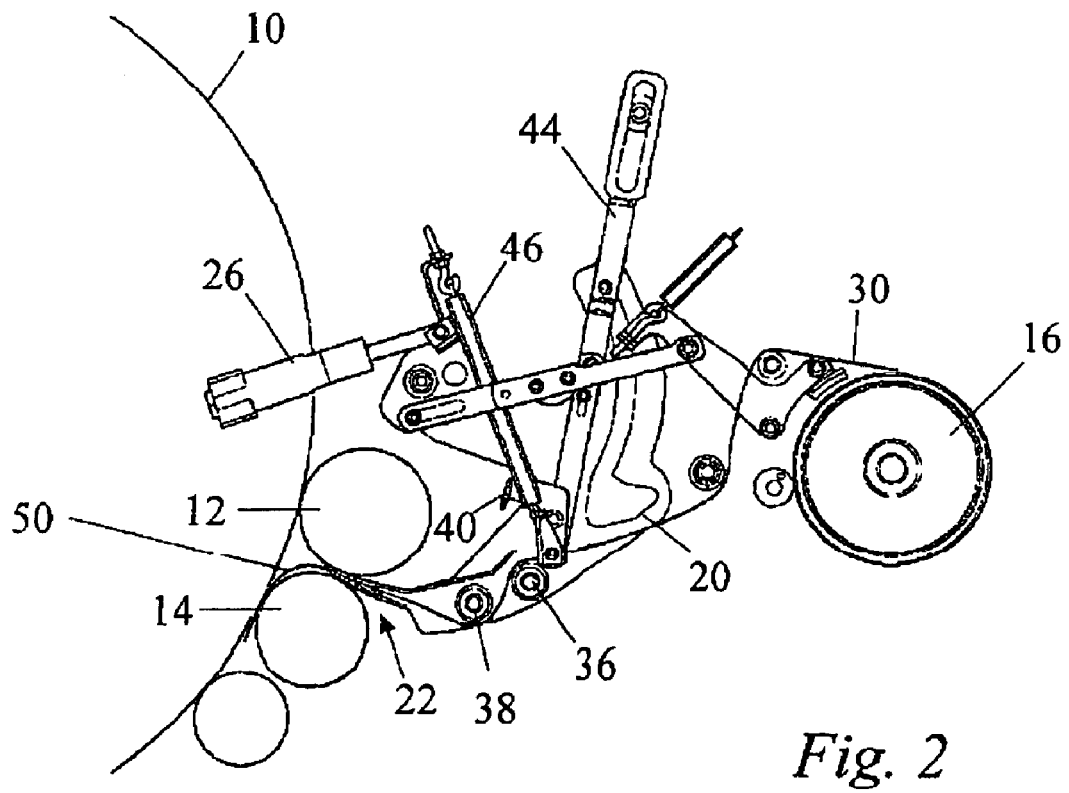
FIG. 2 shows the mechanism of FIG. 1 when the duck bill is in its advanced position.

The two end plates 20 are pivoted about an axis 24 and are caused to pivot by means of hydraulic actuators 26 to move the duck bill 22 between the two end positions show in FIGS. 1 and 2. The wrapping material 30 is guided over fixed guide rollers 32 and 34 and two guide rollers 36 and 38 that are mounted for movement with the duck bill 22 and the end plates 20. As is known, each of the guide rollers 36 and 38 may be formed near its two axial ends with oppositely handed helical formations which act as spreaders to keep the wrapping material taut across the width of the duck bill 22.

FIGS. 1 and 2 also show a cutting mechanism for severing the wrapping material 30 after a bale has been formed. The cutting mechanism comprises a knife 40 pivoted about an axis 42 and operated by means of a push-rod 44. The knife is resiliently biased into the position shown in FIG. 1 by means of a compression spring 46 and the push-rod 44 is guided for linear movement and is displaced by means of a cam slot 48 in the end plates 20.

At the commencement of a wrapping cycle, the duck bill 22 is in the position shown in FIG. 1 in which the knife 40 has just been operated to sever the wrapping material a short distance in front of the duck bill 22 to leave a loose flat of wrapping material 50 protruding from the duck bill 22.

To commence a new wrapping cycle after the next bale has been formed, the hydraulic actuators 26 are operated to rotate the end plates 20 into the position shown in FIG. 2. This advances the duck bill 22 into the gap between the transverse rollers 12 and 14 and the flap 50 of wrapping material is introduced into the bale forming chamber. During correct operation, the flap 50 should then be gripped by the bale 10 and carried round the periphery of the bale forming chamber. At some stage after it has been sensed that the wrapping material is being drawn from the supply roll 16, the duck bill is returned by the end plates 20 to the position shown in FIG. 1. At the end of the wrapping cycle, the cam slot 48 displaces the push-rod 44 to operate the knife 40 once the requisite length of the wrapping material has been dispensed. The cutting operation leaves the loose flat 50 protruding from the duck bill 22, while on the other side the wrapping material is drawn into the bale forming chamber.

The above brief description is believed to suffice for an understanding of the present invention but it should be added that, as so far described, the baler and the wrapping mechanism operate in a manner generally analogous to that well documented in the prior art referred to above and further reference may be made to earlier publications for a more detailed description.

Figure 3:
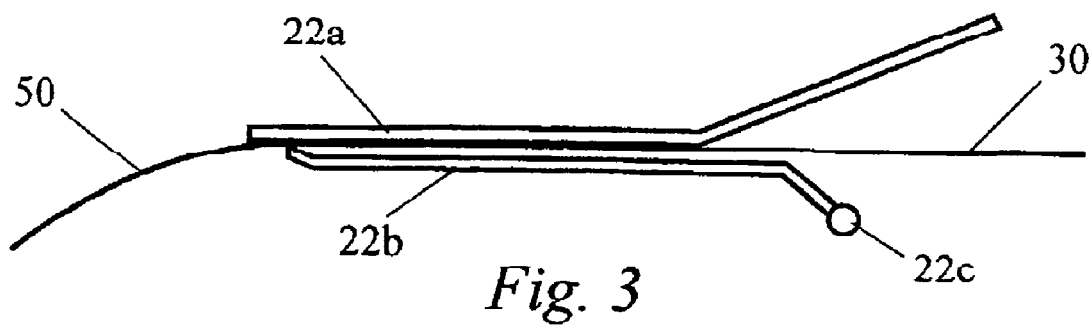
FIG. 3 is a section through a conventional duck bill.

The duck bill 22 known from the prior art is shown in section in FIG. 3. In this drawing, the upper plate 22a is the one fixed to the end plates 20 and the lower plate 22b is pivoted about the axis 22c and urged upwards so that the wrapping material 30 is gripped between the two plates.

Figure 4:
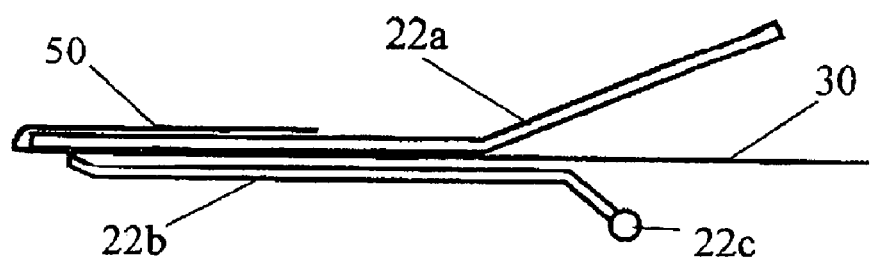
FIG. 4 is a section through the duck bill of FIG. 3 showing the wrapping material folded over the fixed plate of the duck bill.

The problem that the invention seeks to solve may be readily understood from FIG. 4 which shows the loose flap 50 of wrapping material folded over and adhering to the top surface of the fixed plate 22a. When the wrapping material is a plastics film with a tacky top surface, it tends to stick to the fixed plate 22a and is not entrained by the bale when the duck bill 22 is advanced between the two rollers 12 and 14.

Figure 5:
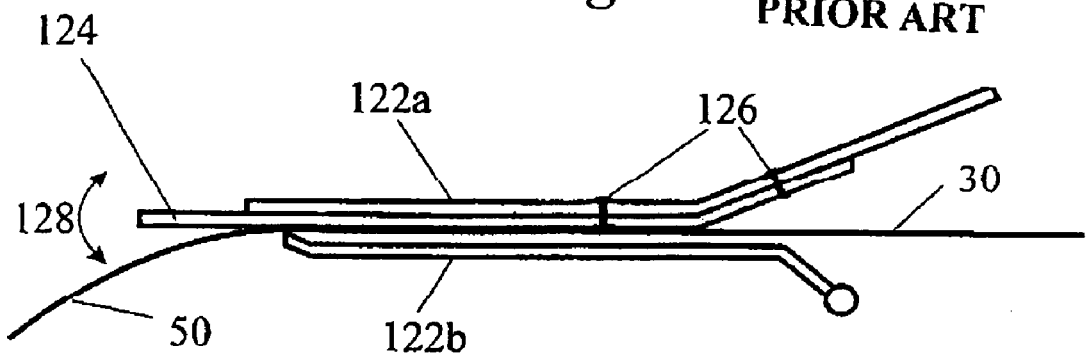
FIG. 5 is a section similar to FIG. 3 showing a duck bill constructed in accordance with the present invention.

To mitigate this problem, a duck bill 122 of the invention as shown in FIG. 5 includes an attachment 124, herein also termed a baffle plate, which is secured to the lower side of the fixed plate 122a and projects beyond the fixed plate 122a. No modification is required to the hinged plate 122b.

Figure 6:
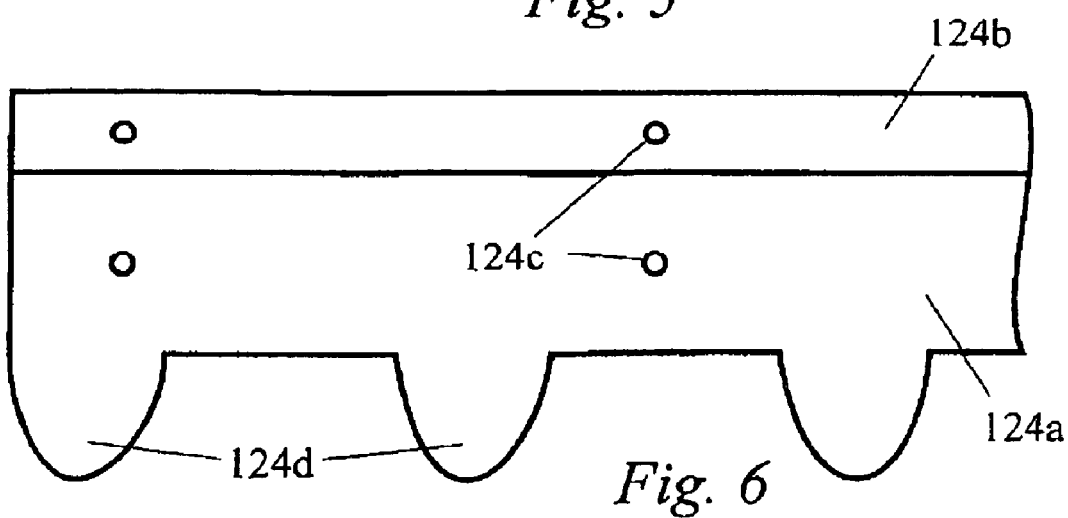
FIG. 6 is a plan view of the baffle plate secured to the fixed plate of the duck bill in FIG. 5.

The baffle 124 when viewed from above has the shape shown in FIG. 6. The baffle 124 has two mutually inclined planar sections 124a and 124b shaped to conform to the fixed plate 122a. Holes 124c are formed in the baffle 124 to receive rivets 126 which act to secure the baffle 124 to the fixed plate 122a. The heads of the rivets or other fastenings should be rounded or recessed into the baffle 124 to prevent them from snagging on the wrapping material and impeding its passage through the duck bill 122.

The leading edge of the baffle 124 which is also the leading edge of the duck bill 122, has fingers 124d that are well spaced from one another. The fingers 124, which may typically be three to four centimeters in length, are resiliently flexible in the direction of the arrow 128 in FIG. 5 and this allows them to be driven into the bale forming chamber to a greater extent than in the prior art.

It is in practice not advisable, nor indeed necessary, for the fingers to penetrate so far into the bale forming chamber as to make full contact with the bale. Such contact could flex the fingers so aggressively that they would not be able, upon retraction, to return to their neutral position, despite their flexibility. It is however desirable for the fingers to go further into the bale chamber than the previously known duck bill plates, and in the present invention the fingers do project beyond the narrowest point of the gap between the two rollers 12 and 14.

Although the bale shape is shown as a perfect circle 10, it will be appreciated that in reality it is not, and there will be bits and pieces of the crop which stick out and are able to grip the wrapping material. To minimize the stress on the fingers, there is a counter on one of the wrapping material guide rollers which detects when the wrapping material is being gripped by the bale. Upon this detection, the duck bill is immediately retracted, even though it may still be able to advance further into the bale forming chamber, so as to avoid the fingers being flexed more than necessary. Only if the outer bale shape is exceptionally smooth and the plastic film is folded back onto the duck bill, would it be necessary for the duck bill to penetrate to its maximum degree into the bale forming chamber and in that case the tips of the fingers would come into very close proximity with the bale surface.

Figure 7:
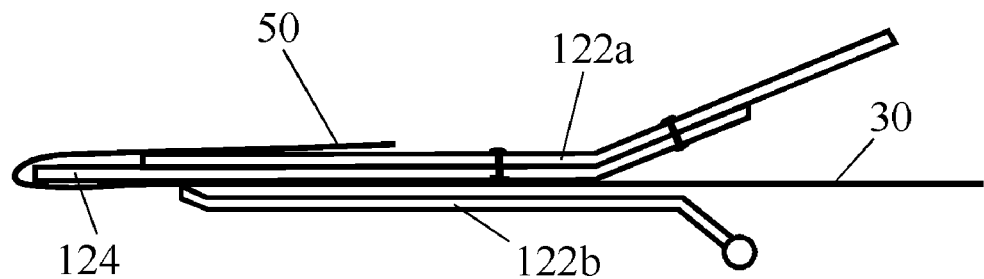
FIG. 7 is a section showing a duck bill of the present invention with wrapping material folded over the fixed plate of the duck bill.
Figure 8:
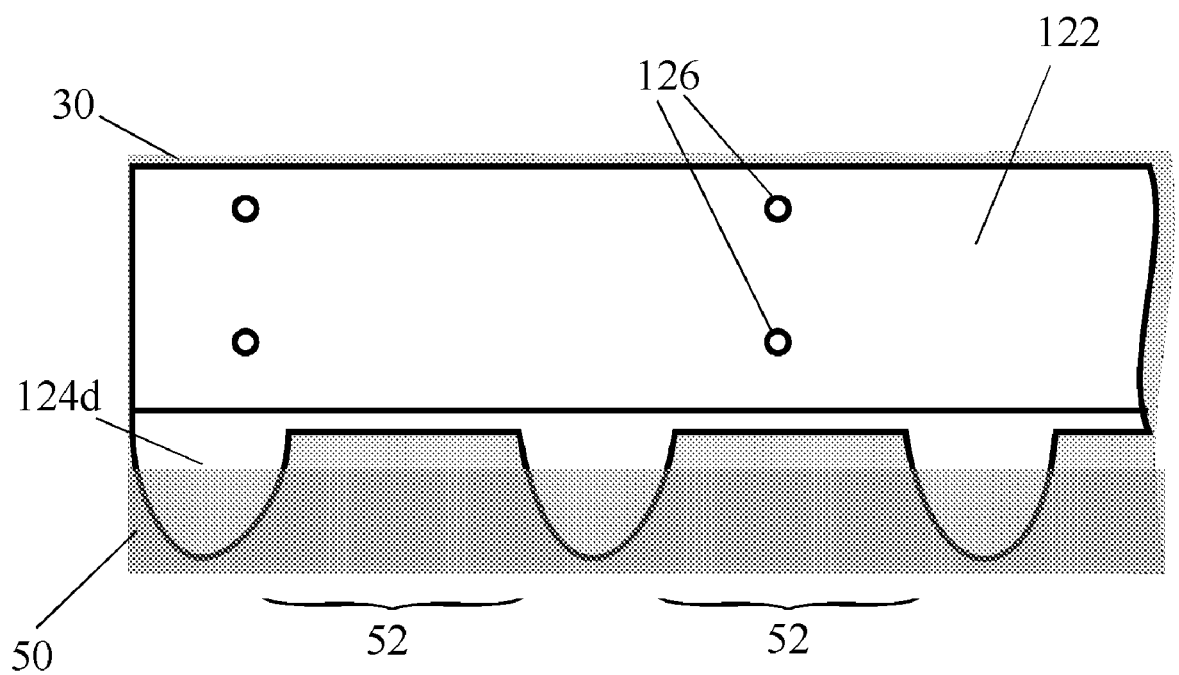
FIG. 8 is a plan view showing the effect of the folding over of the wrapping material.

The effect of the flap 50 being folded over the leading edge of the duck bill in the case of a duck bill 122 of the invention is shown in FIGS. 7 and 8. If the flap 50 when folded over does not fully cover the fingers 124*d*, as shown in FIG. 8, then the action of the crop in the bale will be to wipe the top surface of the fingers 124*d* and when the edge of the flap is contacted by the crop, the flap 50 will be peeled off the fingers and entrained by the bale.

Even in the event that the flap 50 does fully envelope the fingers 124*d*, as shown in FIG. 7, the crop is still able to engage the regions 52 between the fingers and grip them sufficiently strongly to enable the wrapping material to be pulled off the duck bill 122 and drawn around the bale forming chamber.

Though designed to operate reliably with plastics wrapping film, the duck bill also acts to prevent misfeeds when used with netting. Any attempt to draw the flap of netting upwards as viewed in FIG. 7, which would risk it being entangled in the workings of the bale, will result in the netting being impaled on the fingers 124*d* and thereby prevented from being pulled off the supply roll 16.

The baffle 124 is preferably made of a plastics material, such as a polyamide, which will allow the fingers 124*d* to flex. To prevent them from piercing the wrapping material, it is desirable for the fingers 124*d* to have rounded tips, as shown, and for them to be able to flex in both of the directions represented by the arrow 128 in FIG. 5. When the duck bill retracts during wrapping of the bale, the angle between the duck bill and the wrapping material changes. It can be seen from FIG. 1 that if a line is drawn from the duck bill towards the gap between rollers 12 and 14, then the wrapping material would not extend in line with the duck bill plates 122*a* and 122*b*, but at an obtuse angle to the top plate 122*a*. If the teeth 124*d* are not flexible in the upward direction, they could damage the wrapping material 30.

What is claimed is:

1. A round baler comprising:
a bale forming chamber and a device having first and second plates configured for grasping a material, only the first plate having a resilient leading edge having flexible fingers for feeding wrapping material from a supply roll into the bale forming chamber between two transverse rollers acting to cause the crop to rotate within the bale forming chamber,
wherein the device is displaceably mounted in the baler for movement between a retracted position in which the flexible fingers lie outside the bale forming chamber and an advanced position in which the plates extend into a gap between the rollers and the flexible fingers pass between and beyond a narrowest point of the gap between the transverse rollers so as to lie close to the path of the crop material within the bale forming chamber.

2. A round baler for making cylindrical bales of crop material comprising:
a baler frame;
a tailgate pivotally connected to said baler frame;
a bale forming chamber;
a sledge assembly mounted on said baler frame; said sledge assembly including a plurality of rollers extending transversely of said baler frame;
a wrapping device when in a dispensing position feeds wrapping material from a supply roll into said bale forming chamber between two transverse rollers, the wrapping device having first and second elongate rigid plates which extend into a gap between first and second transverse rollers when the wrapping device is in the dispensing position and that are biased towards one another to grip the wrapping material therebetween; and
the first plate having a resiliently flexible leading edge that projects further than the edge of the second plate in the feeding direction of the wrapping material, wherein the leading edge is formed with forward projecting fingers which are transversely spaced from one another, the leading edge projecting beyond the narrowest point of the gap between the two rollers when the device is in the dispensing position.

3. The baler of claim 2, wherein the tips of the fingers are rounded to avoid their piercing the wrapping material.

4. The baler of claim 2, wherein the flexible leading edge is a separate attachment mounted to a gripping portion of the first rigid elongate plate.

5. The baler of claim 4, wherein the attachment is formed of a plastics material.

6. The baler of claim 5, wherein the plastics material is a polyamide.

7. The baler of claim 4, wherein the attachment is secured to one of the elongate plates by means of mechanical fixings having heads, the heads of which fixings are received in recesses in the attachment so as not to project into contact with the wrapping material.

8. The baler of claim 2, wherein the device is displaceably mounted in the baler for movement between a retracted position in which the flexible leading edge lies outside the bale forming chamber and a dispensing position in which the leading edge passes between and beyond a narrowest point of a gap between the transverse rollers so as to lie close to the path of the crop material within the bale forming chamber.

9. The baler of claim 2, wherein a counter connected to a wrapping material guide roller is configured to detect when a wrapping material is gripped by the bale and upon detection the device is configured to immediately retract the leading edge from the dispensing position and the bale forming chamber.

* * * * *